US012729828B2

(12) United States Patent
Bartscher et al.

(10) Patent No.: US 12,729,828 B2
(45) Date of Patent: Sep. 8, 2026

(54) LIGHT MODULE FOR A MOTOR VEHICLE LIGHTING DEVICE, AND METHOD FOR PRODUCING A LIGHT MODULE

(71) Applicant: HELLA GmbH & Co. KGaA, Lippstadt (DE)

(72) Inventors: Sebastian Bartscher, Hamm (DE); Frank Brinkmeier, Lippstadt (DE); Werner Koesters, Coesfeld-Lette (DE); Michael Lakenbrink, Oelde (DE); Thomas Wiese, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/943,829

(22) Filed: Nov. 11, 2024

(65) Prior Publication Data

US 2025/0067415 A1 Feb. 27, 2025

Related U.S. Application Data

(63) Continuation of application No. PCT/EP2023/061513, filed on May 2, 2023.

(30) Foreign Application Priority Data

May 9, 2022 (DE) ..................... 10 2022 111 490.2

(51) Int. Cl.
*F21S 45/47* (2018.01)
*F21S 41/141* (2018.01)

(52) U.S. Cl.
CPC ............ *F21S 45/47* (2018.01); *F21S 41/141* (2018.01)

(58) Field of Classification Search
CPC .................... F21S 41/141; F21S 45/47; H05K 2201/10106; H05K 3/0014;
(Continued)

(56) References Cited

U.S. PATENT DOCUMENTS

2009/0097265 A1* 4/2009 Sun ....................... F21V 29/763 362/373
2009/0296387 A1* 12/2009 Reisenauer ............. F21V 29/83 362/249.02

(Continued)

FOREIGN PATENT DOCUMENTS

DE 102006034425 A1 2/2007
DE 102013111306 A1 4/2015

(Continued)

OTHER PUBLICATIONS

Search English translation of JP 2007042755 A (Year: 2007).*
International Search Report for International Application No. PCT/EP2023/061513 mailed Aug. 3, 2023.

*Primary Examiner* — Omar Rojas Cadima
(74) *Attorney, Agent, or Firm* — Muncy, Geissler, Olds & Lowe, P.C.

(57) ABSTRACT

A light module for a motor vehicle lighting device, at least comprising an LED lamp, metal conductor tracks for electrically contacting the LED lamp, a carrier body on which the LED lamp and the conductor tracks are arranged, and a metal heat sink. The carrier body being form-fittingly connected to the heat sink. The carrier body comprises an electrically insulating and thermally conductive composite material.

11 Claims, 1 Drawing Sheet

(58) Field of Classification Search
CPC ....... H05K 2201/09118; H05K 1/0209; H05K 1/0206; H05K 2201/2072; H05K 1/0204; H05K 3/0061; H05K 2201/10416
See application file for complete search history.

(56) References Cited

U.S. PATENT DOCUMENTS

| | | | |
|---|---|---|---|
| 2019/0002647 | A1 | 1/2019 | Timmroth et al. |
| 2020/0010646 | A1 | 1/2020 | Timmroth et al. |
| 2022/0258429 | A1 | 8/2022 | Brinkmeier et al. |

FOREIGN PATENT DOCUMENTS

| | | | | |
|---|---|---|---|---|
| DE | 102014111278 | A1 | | 2/2016 |
| DE | 102015015276 | A1 | | 2/2017 |
| DE | 102017001013 | A1 | | 8/2018 |
| DE | 102018009292 | A1 | | 5/2020 |
| DE | 102019111449 | A1 | | 11/2020 |
| DE | 102019129591 | A1 | | 5/2021 |
| EP | 3165549 | B1 | | 7/2015 |
| JP | 2007042755 | A | * | 2/2007 |

* cited by examiner

LIGHT MODULE FOR A MOTOR VEHICLE LIGHTING DEVICE, AND METHOD FOR PRODUCING A LIGHT MODULE

This nonprovisional application is a continuation of International Application No. PCT/EP2023/061513, which was filed on May 2, 2023, and which claims priority to German Patent Application No. 10 2022 111 490.2, which was filed on May 9, 2022, and which are both herein incorporated by reference.

BACKGROUND OF THE INVENTION

Field of the Invention

The present invention relates to a light module for a motor vehicle lighting device, at least comprising an LED lamp, metal conductor tracks for electrically contacting the LED lamp, a carrier body on which the LED lamp and the conductor tracks are arranged, and a metal heat sink, the carrier body being form-fittingly connected to the heat sink. The invention also relates to methods for the production of such a light module.

Description of the Background Art

Thermal management is a particular challenge when using high-performance LED lamps (LED: light-emitting diode) in light modules of automotive lighting equipment, especially front headlights.

In the conventional art, the LED lamps are arranged on a printed circuit board and this in turn on a metal heat sink. The connection between the LED lamps and the printed circuit board is usually formed by means of a solder connection and the joining gap between the printed circuit board and the heat sink is bridged by means of a thermal paste, for example. A significant contribution to the heat flow resistance between the LED lamps and the heat sink is made by the electrically and thermally insulating carrier body of the printed circuit board. For example, this is made of a flame-retardant composite material formed of epoxy resin and glass fiber fabric, typically a composite material of class FR-4. Alternatively, so-called insulated metal substrates (IMS) for printed circuit boards are known, whose structure usually formed of a sequence of layers formed of an aluminum or copper substrate, an electrically and thermally insulating insulation layer and a copper layer comprising conductor tracks. Among other things, the copper layer is used for lateral heat spreading. The thermal resistance is mainly dominated by the insulation layer.

Furthermore, DE 10 2019 129 591 A1, which corresponds to US 2022/0258429, which is incorporated herein by reference, and which discloses a light module for a motor vehicle lighting device which, instead of a printed circuit board, has a circuit carrier foil made of a thermoplastic, wherein the circuit carrier foil is form-fittingly connected to a metal heat sink.

A disadvantage of the conventional art is the susceptibility of the circuit carrier foil to thermal damage. Due to its low thickness, the circuit carrier foil has only a low heat capacity, so that heat absorption can quickly lead to a critical temperature increase.

SUMMARY OF THE INVENTION

It is therefore the object of the present invention to propose a generic light module for a motor vehicle lighting device, which is characterized in particular by improved thermal management when operating LED lamps.

In an example, the invention includes the technical teaching that the carrier body form-fittingly connected to the heat sink, on which the at least one LED lamp and the associated conductor tracks are arranged, comprises an electrically insulating and thermally conductive composite material.

The invention is based on the idea of significantly reducing the thermal resistance of the carrier body as compared to state-of-the-art superstructures by the carrier body having a functionally integrated composite material which, in addition to the electrical insulation necessary for the operation of the LED lamps, also has a pronounced thermal conductivity. Due to such advantageous material properties, the thermal resistance between the LED lamps and the metal heat sink can be further reduced as compared to the examples known from the prior art, so that a particularly efficient heat dissipation of the LED lamps and other electrical consumers arranged on the carrier body is possible during operation of the light module according to the invention. This is also due to the form-fitting connection of the carrier body to the heat sink, wherein the associated joining surface is preferably large and determines the heat transfer from the carrier body to the heat sink. In contrast to a light module with a circuit board from the state of the art, there is therefore no joining gap to the heat sink that interrupts the heat flow.

Suitable composites in particular have a matrix of a plastic, preferably a polyamide or another semi-crystalline plastic, and metal, ceramic and/or graphitic fillers, the fillers preferably having a globular shape and a homogeneous distribution in the matrix. Such composites are known from the publications DE 10 2015 015 276 A1 (which corresponds to US 2019/0002647 and is incorporated herein by reference) and DE 10 2017 001 013 A1 (which corresponds to US 2020/0010646 and is incorporated herein by reference). In particular, the electrical and thermal properties of these composite materials can be “tailored” by varying the packing density of the fillers. The material properties “electrically insulating” and “thermally conductive” can be considered in such a way that appropriate values of electrical resistance and thermal conductivity are available with regard to a specific example of a light module according to the invention. The design of these values is measured in particular by the electrical currents flowing through the conductor tracks during operation of the light module and by the heat to be dissipated. In particular, the desired electrical and thermal properties should be isotropic, to which a globular shape of the fillers and a homogeneous distribution within the formed carrier body contribute, for example.

For example, the carrier body has an electrical insulation resistance of at least $10^7 \Omega$ (10 megaohms) and/or the composite material has a thermal conductivity of at least 4 W/mK, preferably at least 10 W/mK. In order to achieve the desired insulation resistance with the appropriate dimensions of the carrier body, the composite material, for example, has an electrical contact resistance of at least $10^9$ Ωm (at 500 V test voltage, according to DIN EN 61340-2-3).

The carrier body, for example, has a thickness of 0.5-5 millimeters, preferably 1-3 millimeters. Such a thickness enables lateral heat spreading within the carrier body, so that the undesirable formation of thermal hot spots in particular can be suppressed. Furthermore, sufficient thickness is required to ensure a reliable manufacturing process of the thermal body by injection molding.

Preferably, the carrier body forms a full-surface joining zone with the heat sink, wherein the heat sink has a joining surface with microscale and/or nanoscale cavities in the joining zone, which the composite material of the carrier body fills to form a form-fitting connection, preferably forming undercuts. The lateral dimensions of the joining zone preferably correspond essentially to the lateral dimensions of the carrier body, i.e., the entire cross-section of the carrier body contributes to the heat transport into the heat sink. The microscale and/or nanoscale cavities introduced into the joining surface provide a further increase in the effective surface area for heat transfer. For example, the cavities can be dimpled or grooved depressions in a rectilinear or meandering shape, or have a more complex topography, and for example, there may also be a combination of cavities and surface elevations. The dimensions of the surface structures are preferably adapted to the formability of the specific composite material of the carrier body, for example, microscale cavities have characteristic structural dimensions in the order of 1-100 micrometers. In particular, nano structuring can provide a targeted change in the surface energy and thus influence the degree of wetting of the metal surface with the matrix material softened during production. Cavities and geometric undercuts create a form-fitting connection both perpendicular and parallel to the plane normal of the joining surface. The undercuts can be formed, for example, by steps or bulges in a cavity.

The heat sink can have at least one metal heat dissipation element for the at least one LED lamp, wherein the heat dissipation element protrudes from the joining surface of the heat sink and is enclosed laterally by the carrier body, in such a way that a direct thermal bridge is formed between the LED lamp and the heat sink by means of the heat dissipation element. Such a heat dissipation element is preferably one-piece and uniform in terms of material with the heat sink and contacts the LED lamp, for example, by means of a solder connection or a thermal paste, so that a particularly efficient heat dissipation from the operated LED lamp can take place.

Furthermore, the light module according to the invention may comprise at least one metal heat spreading element, which is at least partially enclosed by the composite material of the carrier body. For example, the heat spreading element can be shaped in the form of a metal sheet and oriented parallel to the joining surface of the heat sink with the carrier body, so that lateral heat spreading is possible.

The invention further relates to different methods for the production of a light module according to a previously mentioned example.

A first production process includes at least the following steps: provision of the metal heat sink; insertion of microscale and/or nanoscale cavities into the joining surface of the heat sink; injection molding of the carrier body from the electrically insulating and thermally conductive composite material, wherein the composite material of the carrier body fills the cavities in the joining surface of the heat sink, forming a positive connection; application of the metal conductor tracks to the carrier body; and application of the at least one LED lamp.

For example, the insertion of the microscale and/or nanoscale cavities into the joining surface of the heat sink is carried out by means of an electrochemical process, by means of laser material processing or by means of a mechanical process. For example, electrochemical ablation processes are suitable for the introduction of complex surface structures into metallic conductive workpieces with accuracies in the micrometer range. For higher manufacturing precision down to the nanometer range, modern methods of laser material processing and photonics can be used. Mechanical processes are cost-effective alternatives, wherein, for example, structures with undercuts can also be realized using a combination of milling machines and hammers.

The carrier body can be manufactured together with the conductor tracks as a so-called Molded Interconnect Device (MID), for which the MID manufacturing processes known from the state of the art can be used, such as two-component injection molding, hot stamping, laser structuring or mask exposure processes. The application and electrical contacting of the LED lamps is carried out, for example, by means of a suitable soldering process or by means of thermal conductive adhesives.

In the production of an example of the light module with a heat dissipation element protruding from the joining surface of the heat sink, these can be laterally overmolded by the composite material during injection molding of the carrier body. Additional heat spreading elements can be inserted during injection molding of the carrier body and overmolded by the composite material and thus integrated into the carrier body.

A method for the production of a light module according to the invention can comprise at least the following steps in an unspecified order: provision of the metal heat sink; insertion of microscale and/or nanoscale cavities into the joining surface of the heat sink; provision of the support body; thermal direct joining of the carrier body to the heat sink, wherein the composite material of the carrier body fills the cavities in the joining surface of the heat sink, forming a positive connection; application of the metal conductor tracks to the carrier body; and application of the at least one LED lamp.

A further method for the production of a light module according to the invention comprises at least the following steps in an unspecified order: provision of the metal heat sink; insertion of microscale and/or nanoscale cavities into the joining surface of the heat sink; provision of a carrier foil made of an electrically insulating and thermally conductive composite material; thermal direct joining of the carrier foil to the heat sink, wherein the composite material of the carrier foil fills the cavities in the joining surface of the heat sink, forming a positive connection; provision of the carrier body; thermal direct joining of the carrier body with the carrier foil; and application of the at least one LED lamp and the metal conductor tracks to the carrier body.

In the second and third examples, the carrier body can be provided as a separate component in each case, wherein the application of the at least one LED lamp and the metal conductor tracks can be carried out either before or after the carrier body is connected to the heat sink.

In contrast to the second method, the third method first applies a carrier foil to the joining surface of the heat sink. The carrier foil preferably has the same composite material as the carrier body, so that when the carrier body is joined to the carrier foil, a uniform material body is formed. The advantage of using a carrier foil is, for example, that a high contact pressure can be exerted on the carrier foil when building up the form-fitting connection with the heat sink without fear of damage to any LED lamps or conductors already arranged on the carrier body. The carrier foil bonded to the heat sink then forms a smooth joining surface for the carrier body.

Thermal direct joining can be carried out by heating the carrier body or the carrier foil in the joining zone, for example by means of laser radiation, infrared radiation, convective heat supply and/or inductive or contacting heating of the heat sink. The heating converts the matrix material of the composite material into a softened, flowable state, so that in particular it is possible to fill the cavities in the joining surface of the heat sink to form the tight fit.

With regard to the introduction of the cavities into the joining surface of the heat sink as well as with regard to the application of the at least one LED lamp and the metal conductor tracks to the carrier body, reference is made mutatis mutandis to the above statements set out in connection with the description of the first method according to the invention.

In particular, the carrier body can be provided pre-assembled, i.e., with metal conductors already attached to it and at least one LED lamp.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
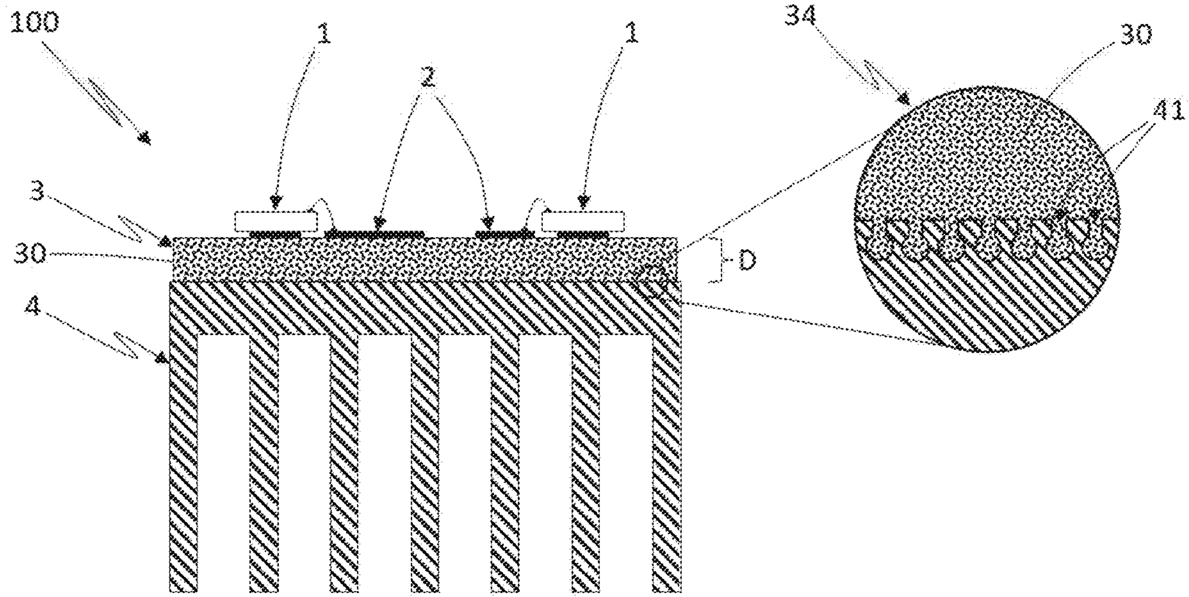
FIG. 1 shows an example of the light module according to the invention.

The figures show schematic cross-sectional views of an example of the inventive light module 100 for a motor vehicle lighting device, respectively the LED lamps 1, the metal conductor tracks 2 for the electrical contacting of the LED lamps 1, the carrier body 3, on which the LED lamps 1 and the conductor tracks 2 are arranged, as well as the metal heat sink 4, wherein the carrier body 3 is form-fittingly connected to the heat sink 4. According to the invention, the carrier body 3 has the electrically insulating and thermally conductive composite material 30.

Due to the pronounced thermal conductivity of the composite material 30, which is at least 4 W/mK, in particular more than 10 W/mK, for example, extremely efficient heat dissipation takes place through the carrier body 3 into the heat sink 4 during operation of the LED lamps 1. The thickness D of the carrier body 3 is preferably 1-3 millimeters, so that the carrier body 3 has a sufficiently high heat capacity to distribute and dissipate the resulting heat flow without thermal damage.

The inset of FIG. 1 shows an enlarged cross-sectional view of the full-surface joining zone 34 between the heat sink 4 and the carrier body 3. The heat sink 4 has a joining surface in the joining zone 34 with the microscale and/or nanoscale cavities 41, which the composite material 30 of the carrier body 3 fills to form a form-fitting connection. Due to the bulging shape of the cavities 41, the penetrated composite material 30 forms undercuts of the carrier body 3.

Figure 2:
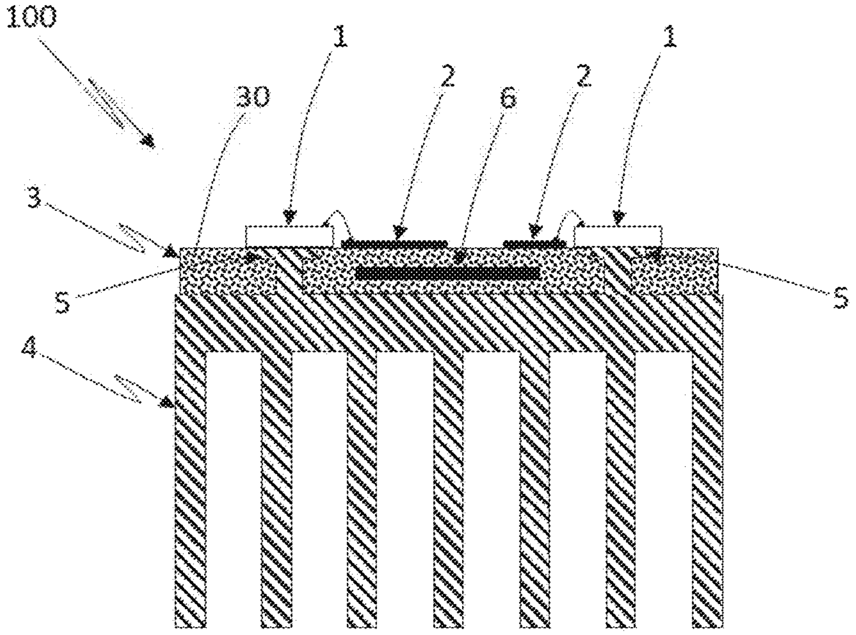
FIG. 2 shows a further example.

In the example of FIG. 2, the heat sink 4 has the metal heat dissipation elements 5, to which the LED lamps 1 are soldered as examples. The heat dissipation elements 5 are designed in one piece and uniform in terms of material with the heat sink 4 and are laterally enclosed by the support body 3, so that a direct metal heat bridge is formed between the LED lamps 1 and the heat sink 4 by means of the heat dissipation elements 5, which enables particularly fast heat dissipation.

Furthermore, the light module 100 includes the metal heat spreading element 6, which is enclosed by the composite material 30 of the carrier body 3 and contributes to the improvement of the lateral heat spread within the carrier body 3.

The invention is not limited in its execution to the examples given above. Rather, a number of variants are conceivable, which make use of the solution presented even in the case of fundamentally different designs. All features and/or advantages arising from the claims, the description or the drawings, including design details, spatial arrangements and method steps, can be essential to the invention both on their own and in the most diverse combinations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A light module for a motor vehicle lighting device, the light module comprising:

- an LED lamp;
- metal conductor tracks for electrical contacting the LED lamp;
- a carrier body on which the LED lamp and the conductor tracks are arranged; and
- a metal heat sink,
- wherein the carrier body is form-fittingly connected to the heat sink,
- wherein the carrier body comprises an electrically insulating and thermally conductive composite material, and
- wherein the composite material has a matrix of a plastic and metal, ceramic and/or graphitic fillers, wherein the fillers have a globular shape and a homogeneous distribution in the matrix.

2. The light module according to claim 1, wherein the carrier body has an electrical insulation resistance of at least 107Ω and/or the composite material has a thermal conductivity of at least 4 W/mK.

3. The light module according to claim 1, wherein the plastic is a polyamide or another semi-crystalline plastic.

4. The light module according to claim 1, wherein the carrier body has a thickness of 0.5 to 5 millimeters.

5. The light module according to claim 1, wherein the heat sink has at least one metal heat dissipation element for contacting the at least one LED lamp, wherein the at least one heat dissipation element protrudes from a joining surface of the heat sink and is laterally enclosed by the carrier body such that via the at least one heat dissipation element, a thermal bridge is created between the LED lamp and the heat sink.

6. The light module according to claim 5, wherein the carrier body forms a joining zone with the heat sink, wherein, in the joining zone, the heat sink has a joining surface with microscale and/or nanoscale cavities recessed in the joining surface, which the composite material of the carrier body fills by forming a form-fitting connection.

7. The light module according to claim 1, wherein the light module comprises at least one metal heat spreading element that is separate from the heat sink and is at least partially enclosed by the composite material of the carrier body.

8. A method for producing a light module for a motor vehicle lighting device according to claim 1, the method comprising:

providing the metal heat sink;

inserting microscale and/or nanoscale cavities into the joining surface of the heat sink;

providing the carrier body;

thermal direct joining of the carrier body with the heat sink, wherein the composite material of the carrier body fills the cavities in the joining surface of the heat sink, forming a positive connection;

applying the metal conductor tracks to the carrier body; and applying the at least one LED lamp.

9. A method for producing a light module for a motor vehicle lighting device, the method comprising:

providing a metal heat sink;

inserting microscale and/or nanoscale cavities into a joining surface of the heat sink;

injection molding a carrier body from an electrically insulating and thermally conductive composite material, the composite material of the carrier body filling the cavities in the joining surface of the heat sink thereby forming a positive connection;

applying metal conductor tracks to the carrier body; and applying at least one LED lamp.

10. A method for producing a light module for a motor vehicle lighting device, the method comprising:

providing a metal heat sink;

inserting microscale and/or nanoscale cavities into a joining surface of the heat sink;

providing a carrier foil made of an electrically insulating and thermally conductive composite material;

thermal direct joining of the carrier foil with the heat sink, wherein the composite material of the carrier foil fills the cavities in the joining surface of the heat sink, forming a positive connection;

providing a carrier body;

thermal direct joining of the carrier body with the carrier foil; and applying at least one LED lamp and metal conductor tracks to the carrier body.

11. The method according to claim 10, wherein the thermal direct joining is carried out by heating the carrier body and/or the carrier foil in a joining zone by laser radiation, by infrared radiation, by convective heat supply and/or by an inductive or contacting heating of the heat sink.

* * * * *